UNITED STATES PATENT OFFICE.

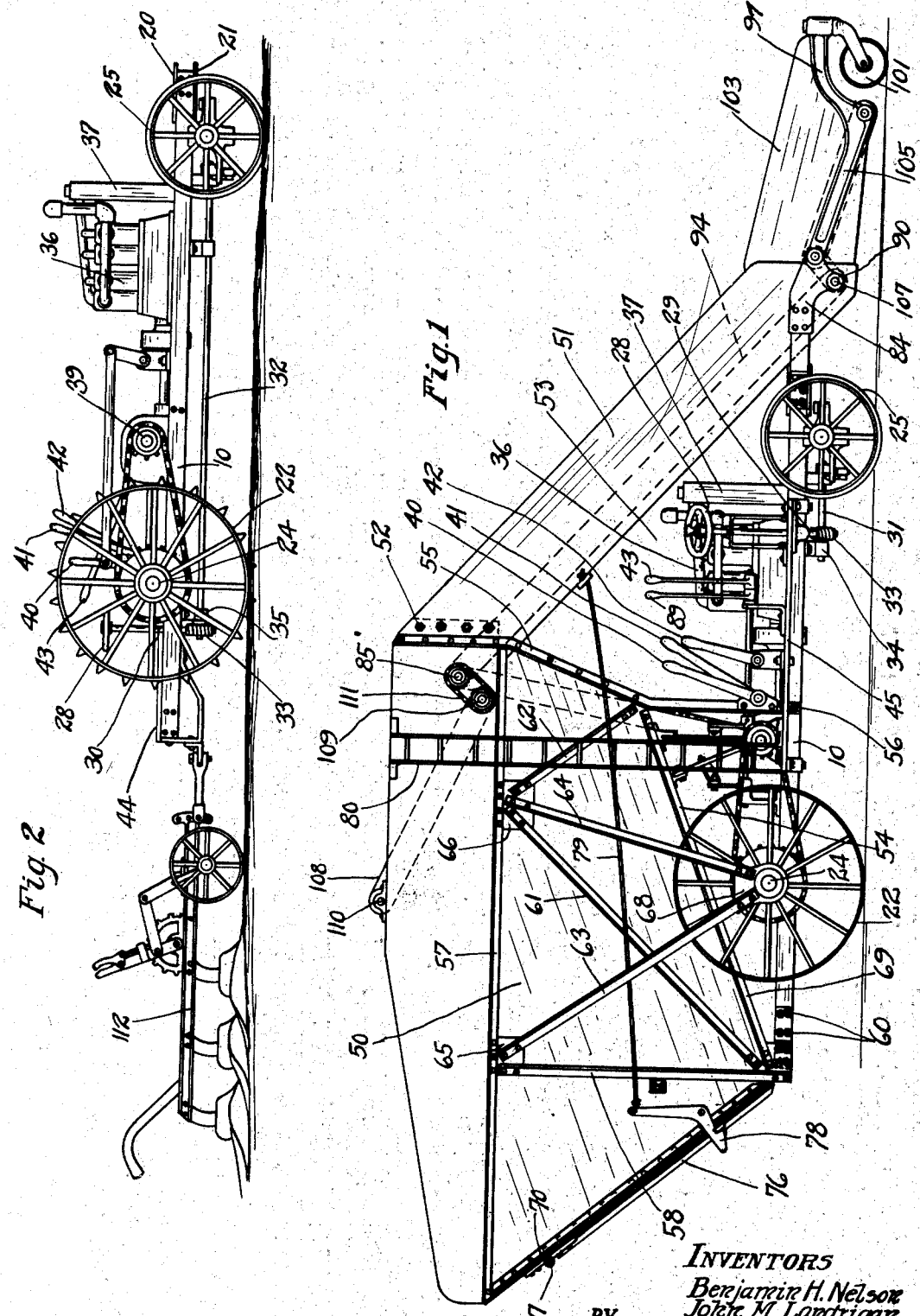

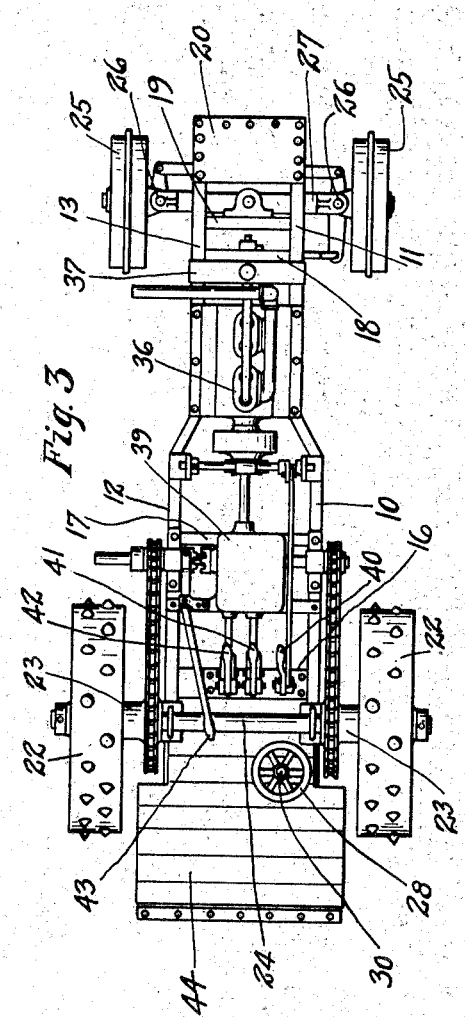

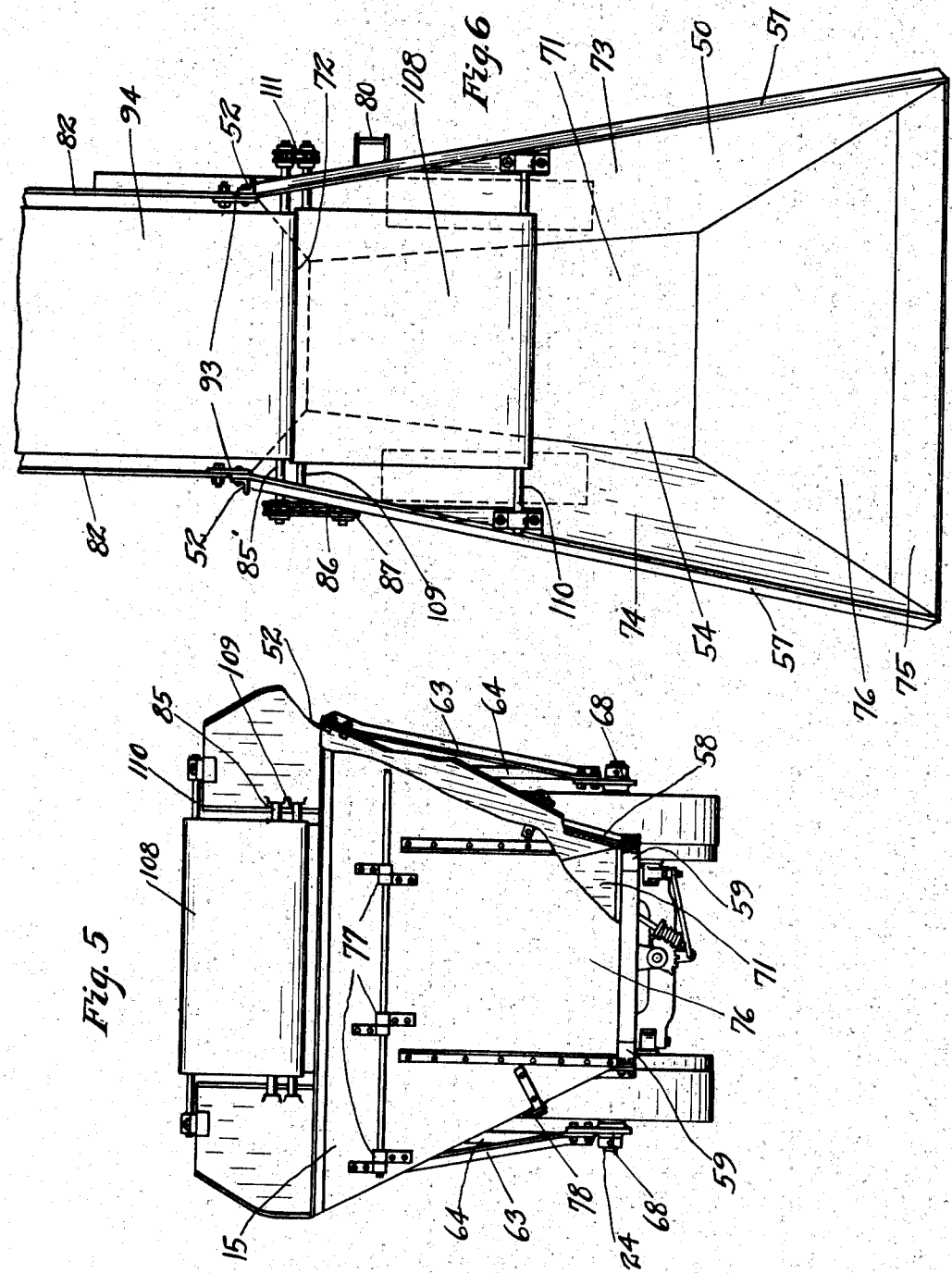

BENJAMIN H. NELSON, OF ST. THOMAS, NORTH DAKOTA, AND JOHN M. LANDRIGAN, OF VIRGINIA, AND LAWRENCE G. ZESBAUGH, OF MINNEAPOLIS, MINNESOTA, ASSIGNORS TO TRAVELING SHOCK GATHERER COMPANY, OF MINNEAPOLIS, MINNESOTA, A CORPORATION.

SHOCK-GATHERER.

1,300,188.   Specification of Letters Patent.   Patented Apr. 8, 1919.

Application filed November 17, 1917. Serial No. 202,632.

*To all whom it may concern:*

Be it known that we, BENJAMIN H. NELSON, JOHN M. LANDRIGAN, and LAWRENCE G. ZESBAUGH, citizens of the United States, residing at St. Thomas, Pembina county, North Dakota; Virginia, St. Louis county, Minnesota, and Minneapolis, Hennepin county, Minnesota, respectively, have invented certain new and useful Improvements in Shock-Gatherers, of which the following is a specification.

Our invention relates to an inter-convertible tractor and self-contained shock loader and has for its object to provide in combination with a traction engine suitable for usual tractor purposes, a shock-loading attachment which is adapted to be supported upon the frame of the traction engine and readily to be removable therefrom, and which provides a shock pickup mechanism and a tank or receptacle for holding the shocks until they may be conveyed to a convenient point of discharge. The shock loading and conveying mechanism is so connected with the frame of the tractor as not to interfere in any way with the parts or method of operation of the traction engine, and at the same time provides an efficient shock loading and conveying apparatus.

The full objects and advantages of our invention will appear in connection with the detailed description thereof and are particularly pointed out in the claims.

In the drawings, illustrating an application of our invention in one form,—

Figure 1 is a side elevation of a traction engine having our improved shock loading and conveying mechanism applied thereto. Fig. 2 is a view of the same traction engine when equipped for the ordinary purposes of a tractor such as hauling plows. Fig. 3 is a plan view of the tractor as illustrated in Fig. 2. Fig. 4 is a plan view in horizontal section of the tractor having the shock loading parts connected therewith. Fig. 5 is an end elevation of the mechanism of the shock loader connected therewith. Fig. 6 is a plan view of the parts shown in Fig. 5.

As illustrated, we provide a traction engine of a generally well-known type except that considerable clearance space between the front and rear wheels is provided. The tractor embodies side frame members 10, 11, 12 and 13. The members 10 and 11 are rigidly secured together by a rear crossbar 14, intermediate crossbars 15, 16, 17, 18, and 19 and upper and lower front plate extensions 20 and 21. Traction wheels 22 have their hubs 23 journaled upon a rear axle 24 and steering wheels 25 are carried upon steering knuckles 26 pivotally connected with a front axle 27 and operated in a well-known way by a steering wheel 28 which is adapted to be positioned forward as indicated at 29 when the machine is operated as a shock loader, and which is positioned at the rear as indicated at 30 when the machine is operated as a tractor. The mechanism for effecting this change is illustrated in Figs. 1 and 2, wherein the steering rod 31, shown in Fig. 1, may be elongated as indicated at 32 in Fig. 2, and the steering worm wheel 33 is positioned inside of bracket support 34 at the front of the frame in Fig. 1 or behind bracket support 35 at the rear of the frame as indicated in Fig. 2.

The motor 36 and radiator 37 are permanently located at the front portion of the frame and operate through a transmission system 39 to drive the traction wheels 22. When the device is used as a tractor, as indicated in Fig. 2, the various control levers 40, 41, 42 and 43 are located at the rear adjacent the platform 44 formed upon the rear portion of the frame as indicated in Figs. 2 and 3, being connected with the parts to be controlled in the usual way. As indicated in Fig. 4, these levers are located adjacent a side platform 45 and operate through supplemental connections 46, 47, 48 and 49 to effect the same control of the motor and tractor mechanism as when they are located in the usual position for a traction engine, adjacent the rear end. It will be understood that platforms 44 and 45 are alternately employed according to whether the machine is used as a traction engine as shown in Fig. 3, or as a shock loading device as shown in Figs. 1 and 4, being removably applied to the frame; and the lever parts by which the levers may be positioned adjacent either platform are also made removable and readily attached and detached from the frame. In no other respect is the operative mechanism of the traction engine as such affected or modified in the conversion of the tractor into a shock loader and conveyer, or vice versa. Adapted to be attached to the ...ction engine so as to convert it into a shock loading conveyer are a rear tank member 50 and a front conveyer frame 51, which are respectively united to the front and rear portions of the traction engine frame and to one another as indicated at 52 in such manner as to bridge the transmission and engine elements, leaving them intact within the space 53 beneath conveyer frame 51 and the forward portion of tank 50 and beneath the sloping bottom 54 of the tank member 50, as clearly indicated in Fig. 1. The tank 50 comprises a frame formed of front members 55 which are removably bolted to the frame members 10 and 12, as indicated at 56. Longitudinal side frame pieces 57, rear frame members 58, which as shown in Fig. 5 slope outwardly and are bolted to arms 59 which in turn are bolted at 60 to the traction engine frame members 10 and 12, oblique frame members 61 and 62 and frame pieces 63 and 64 which extend from union bolts 65 and 66 at frame pieces 57 to extensions 68 removably secured to the ends of the axle 24, where the same protrudes through the hubs of traction wheels 22. Additional frame members are sloping bottom frame members 69 and upwardly sloping rear frame members 70. Upon these sets of frame members is secured, as best shown in Fig. 6, a downwardly-sloping bottom wall 71, an upwardly-sloping nearly vertical front wall 72, outwardly flaring side walls 73 and 74, and an upwardly-sloping rear wall 75 which includes a swinging gate 76 hinged at 77 and held in closed position by a catch 78 operated by a cord 79. A ladder 80 extends up the side of the tank to enable the operator to climb to the top of the tank.

The front conveyer frame 51 has its sides 81, 82 rigidly connected to arms 83, 84 on a transverse frame member 85 which is removably bolted to the front end of the frame between plates 20 and 21. Side pieces 81 and 82 are reinforced at 93 where they are removably bolted to the frame members 52, as clearly shown in Fig. 6. A broad conveyer belt 94 runs over a front roller on a shaft 85' driven by a sprocket chain 86 which, in turn, is driven by a sprocket wheel 87 fast on an extension of one of the drive shafts of the traction engine and controlled by a clutch 88 operated by hand lever 89, as shown in Fig. 4. The belt 94, as indicated in dotted line in Fig. 1 runs over an idler roller 90 journaled in a portion of arms 83 and 84 and operates to drive the idler roller. A pick-up frame comprising arms 95 and 96 secured by transverse shafts 97 and 98 is journaled to arms 83 and 84 by extensions 99, 100 of shaft 98, as clearly shown in Fig. 4, thus providing a frame adapted to oscillate up and down. The arms 95 and 96 are upwardly curved as indicated at 97' in Fig. 1 and carry caster wheels 101 and 102 and also side members 103, 104. Over rollers journaled on shafts 97 and 98 extends a pick-up belt 105 which is driven by a sprocket chain 106 running from a sprocket wheel on the shaft 107 of roller 90 and over a sprocket wheel on the shaft 98.

We have discovered that in order properly to balance the load automatically in the tank 50, it is necessary to discharge the bundles substantially midway of the front and rear of the tank. The endless belt 94 is carried into the body of the tank as indicated in Fig. 1 and discharges upon a second endless belt 108 which runs over rollers on shafts 109, 110 journaled in the side walls of tank 50 as indicated in Figs. 1 and 5. The belt 108 is driven by a sprocket chain 111 which runs over sprocket wheels on shafts 85' and 109, respectively.

With this organization, a traction engine in operation in the field as a shock loading and conveying mechanism is driven under its own power and steered and controlled by the operator from the platform 45 at the side of the engine in the usual way. The pick-up belt 105 and its supporting frame are moved in various directions to contact with the shocks in position on the field, the caster wheels 101, 102 permitting this movement. The shocks engaged by the pick-up belt are first lifted from the ground and passed from the pick-up belt to the elevating belt 94, and, in turn, are deposited upon the distributing belt 108, from which they are dumped into the tank 50. When the tank is sufficiently full of bundles thus automatically lifted and loaded the entire apparatus is rapidly driven to the point where a stack is being formed, or where the grain is being threshed. By releasing the rear door 76 the bundles are discharged upon the ground and slide out of the tank by reason of the sloping side, rear and bottom walls, so that the machine without stopping can be driven under its power back into the field to pick up another load of bundles and the operation be continued until all of the bundles and shocks are gathered. When the threshing or stacking period is finished the tank 50, conveyer frame 51 and parts connected therewith can be readily detached, the levers 40, 41, 42, etc., be shifted to the back of the machine, the side platform 45 removed and rear platform 44 installed, whereupon a plow such as indicated at 112 can be attached and the traction engine used for the ordinary purposes of a tractor until a subsequent threshing season arrives.

We claim:

1. In combination with a traction engine and the mechanism for controlling and operating the same, means for converting said traction engine into a shock loading conveyer comprising a tank removably connected to the frame of the traction engine, a carrier frame removably connected to the frame of the traction engine, means for supporting the carrier frame and tank so as to bridge and extend above the controlling and operating mechanism of the traction engine, a platform removably connected to the side of the traction engine frame, and means for assembling the various control levers in proximity to said platform and in operative connection with the parts controlled thereby.

2. In combination with a traction engine and the mechanism for controlling and operating the same, means for converting said traction engine into a shock loading conveyer, comprising a tank having frame members removably connected respectively to the rear of the frame of the traction engine in front of the traction wheels thereof and to the axle of the traction engine, and a carrier frame removably connected to the front end of the traction engine and to the upper part of the tank, means for supporting said carrier frame and tank so as to bridge and extend above the driving and transmission elements of the traction engine.

3. In combination with a traction engine and the mechanism for controlling and operating the same, means for converting said traction engine into a shock loading conveyer, comprising a tank having frame members removably connected respectively to the rear of the frame of the traction engine in front of the traction wheels thereof and to the axle of the traction engine, a carrier frame removably connected to the front end of the traction engine and to the upper part of the tank, means for supporting said carrier frame and tank so as to bridge and extend above the driving and transmission elements of the traction engine, means supported by the carrier frame for picking up bundles and delivering them to the tank, and means supported by and within the tank for delivering the bundles at the central portion of the tank.

4. In combination with a traction engine and the mechanism for controlling and operating the same, a pair of plates connected with the front end of the traction frame and extending beyond the same, a pair of arms connected to the rear end of the traction frame and extending outwardly from the same, a tank removably connected to said traction frame having a part thereof connected to and supported by said outwardly-extended arms, and a carrier frame removably connected to the front end of said traction frame by said forwardly-extended plates, and means for supporting said carrier frame and tank so as to bridge and extend above the controlling and operating mechanism of the traction engine.

In testimony whereof we hereunto affix our signatures.

BENJAMIN H. NELSON.
JOHN M. LANDRIGAN.
LAWRENCE G. ZESBAUGH.